US009823852B2

(12) United States Patent
Okita

(10) Patent No.: US 9,823,852 B2
(45) Date of Patent: Nov. 21, 2017

(54) MEMORY SYSTEM WITH NONVOLATILE MEMORY

(71) Applicant: Toshiba Memory Corporation, Tokyo (JP)

(72) Inventor: Kazuhito Okita, Ota Tokyo (JP)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 15/049,473

(22) Filed: Feb. 22, 2016

(65) Prior Publication Data
US 2016/0320968 A1  Nov. 3, 2016

Related U.S. Application Data

(60) Provisional application No. 62/156,031, filed on May 1, 2015.

(51) Int. Cl.
*G06F 3/06* (2006.01)
(52) U.S. Cl.
CPC ............ *G06F 3/061* (2013.01); *G06F 3/0659* (2013.01); *G06F 3/0679* (2013.01)
(58) Field of Classification Search
CPC ....... G06F 3/061; G06F 3/0659; G06F 3/0688
USPC .................................................. 365/189.15
See application file for complete search history.

(56) References Cited

U.S. PATENT DOCUMENTS

| 7,219,185 B2* | 5/2007 | Luick ................. G06F 12/0895 365/230.03 |
| 7,408,834 B2* | 8/2008 | Conley ............... G06F 12/0862 365/228 |
| 8,977,833 B2 | 3/2015 | Kazui et al. |
| 2005/0195635 A1* | 9/2005 | Conley ............... G06F 12/0862 365/149 |
| 2005/0240733 A1* | 10/2005 | Luick .................. G06F 12/0895 711/137 |
| 2005/0259462 A1* | 11/2005 | Wood .................. G11C 11/4125 365/154 |

(Continued)

FOREIGN PATENT DOCUMENTS

| JP | 2012128815 A | 7/2012 |
| JP | 2012234363 A | 11/2012 |
| JP | 2013061795 A | 4/2013 |

*Primary Examiner* — Pho M Luu
*Assistant Examiner* — Xiaochun L Chen
(74) *Attorney, Agent, or Firm* — Patterson & Sheridan, LLP

(57) ABSTRACT

A memory device includes a nonvolatile memory unit a volatile memory unit, and a memory controller. When the memory controller receives a first read command designating a first address range of the nonvolatile memory from a host, the memory controller reads data of a second address range that includes and is longer than the first address range from the nonvolatile memory unit, stores the data of the second address range in the volatile memory unit, and then transfers the data of the first address range from the volatile memory unit to the host. When the memory controller receives a second read command designating a third address range that follows the first address range and is within the second address range, after receiving the first read command, the memory controller transfers corresponding data that has been already stored in the volatile memory unit to the host.

20 Claims, 6 Drawing Sheets

(56) References Cited

U.S. PATENT DOCUMENTS

2012/0159050 A1  6/2012 Yano et al.
2013/0067147 A1  3/2013 Okita

\* cited by examiner

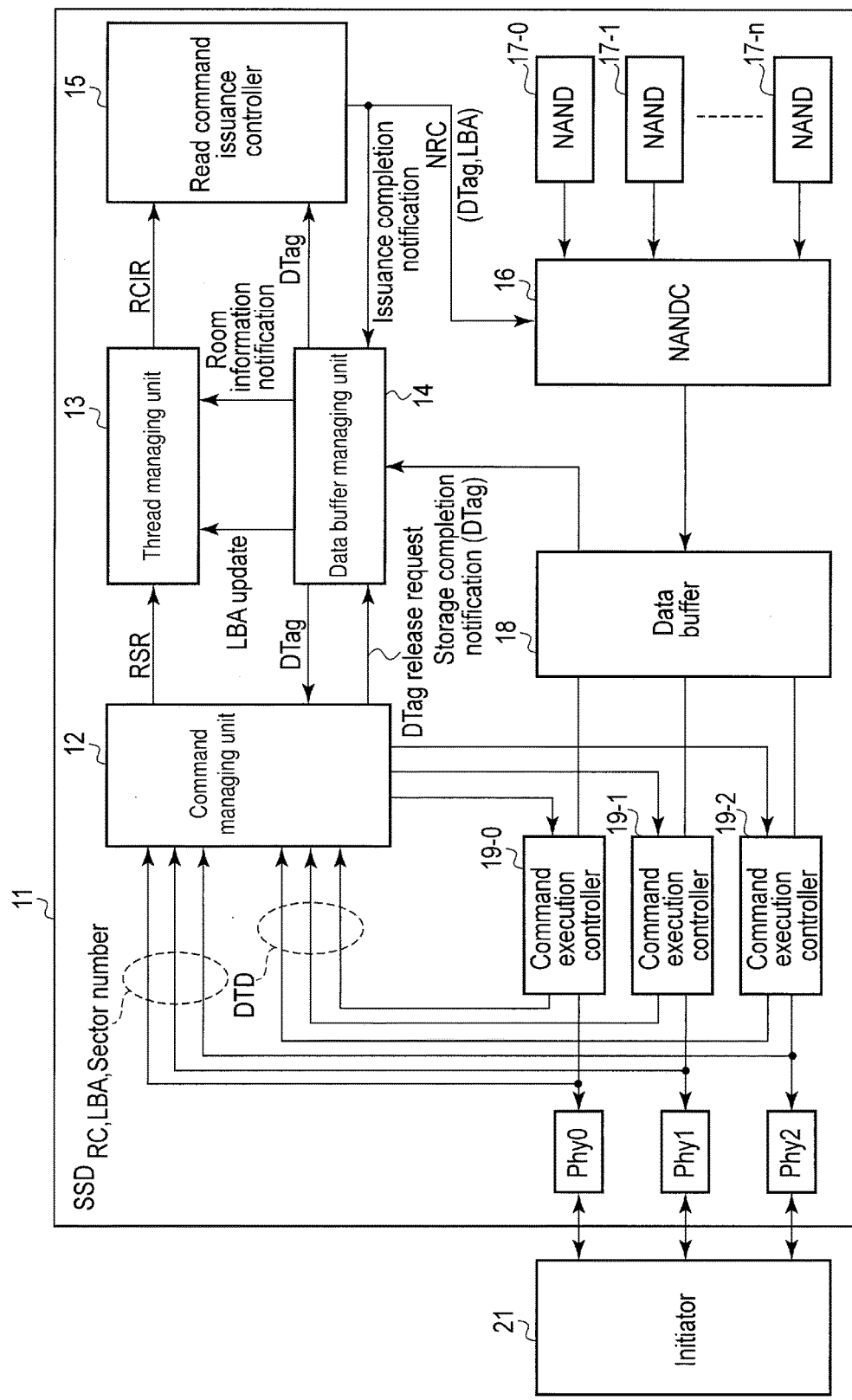
F I G. 1

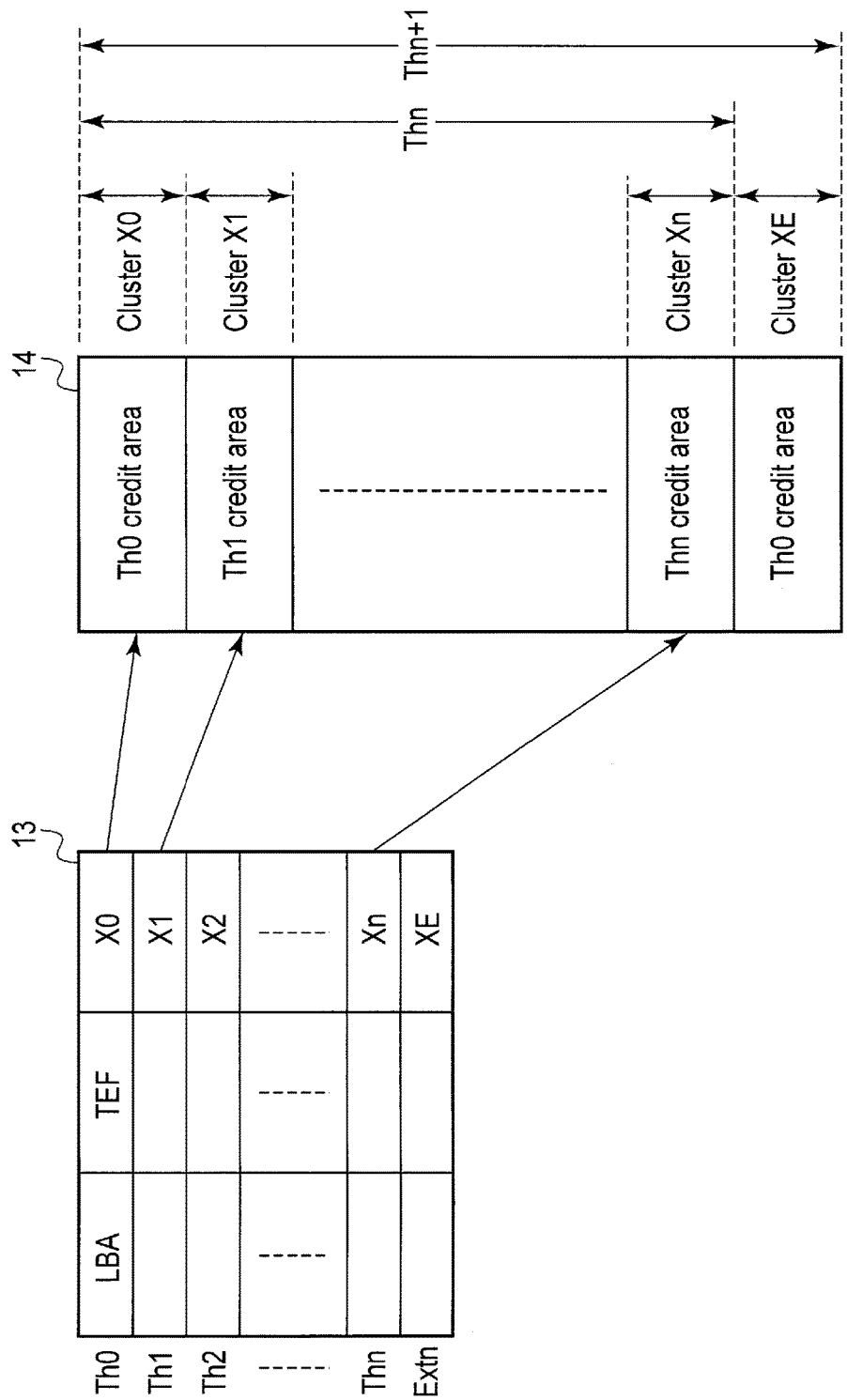
F I G. 5

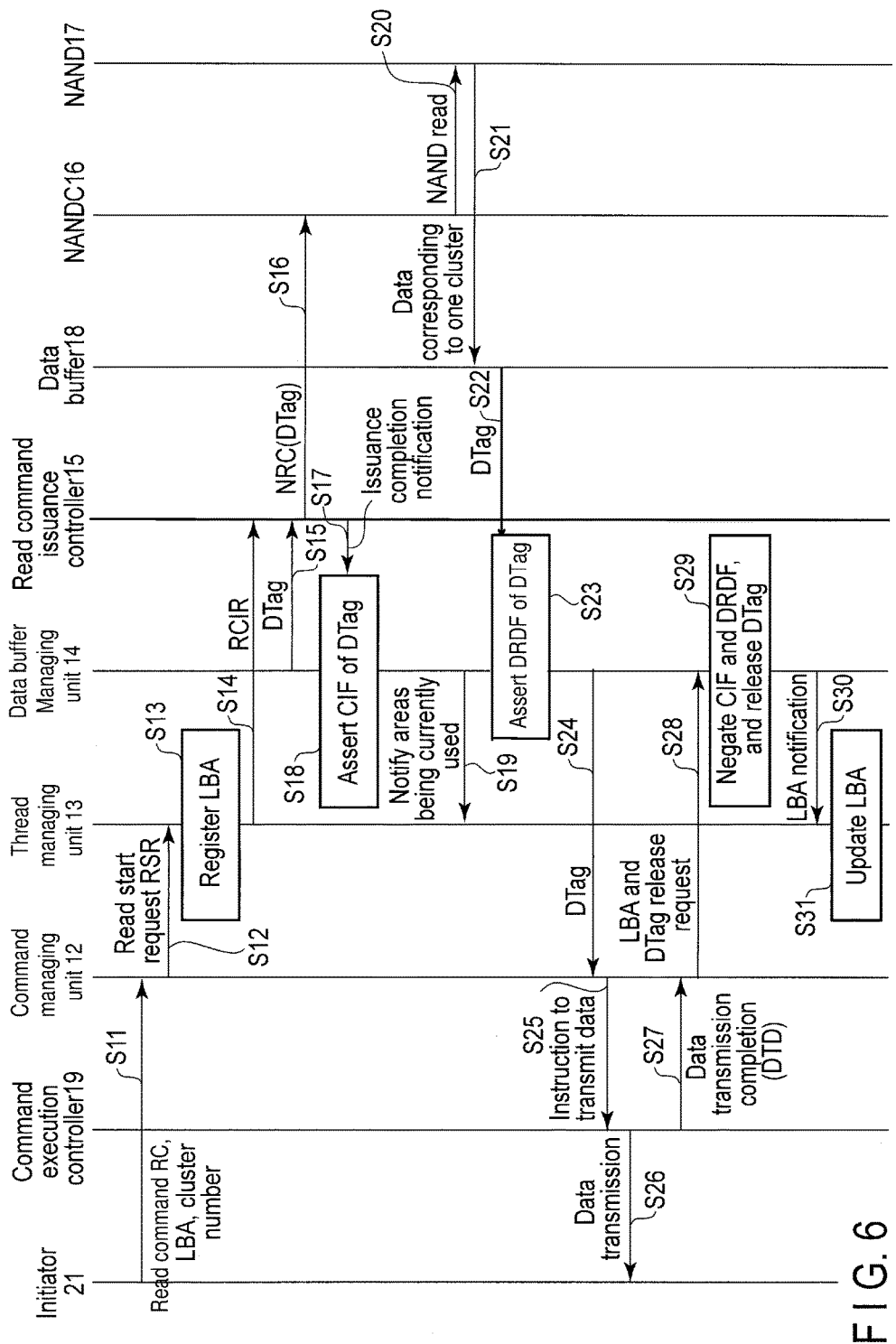
F I G. 6

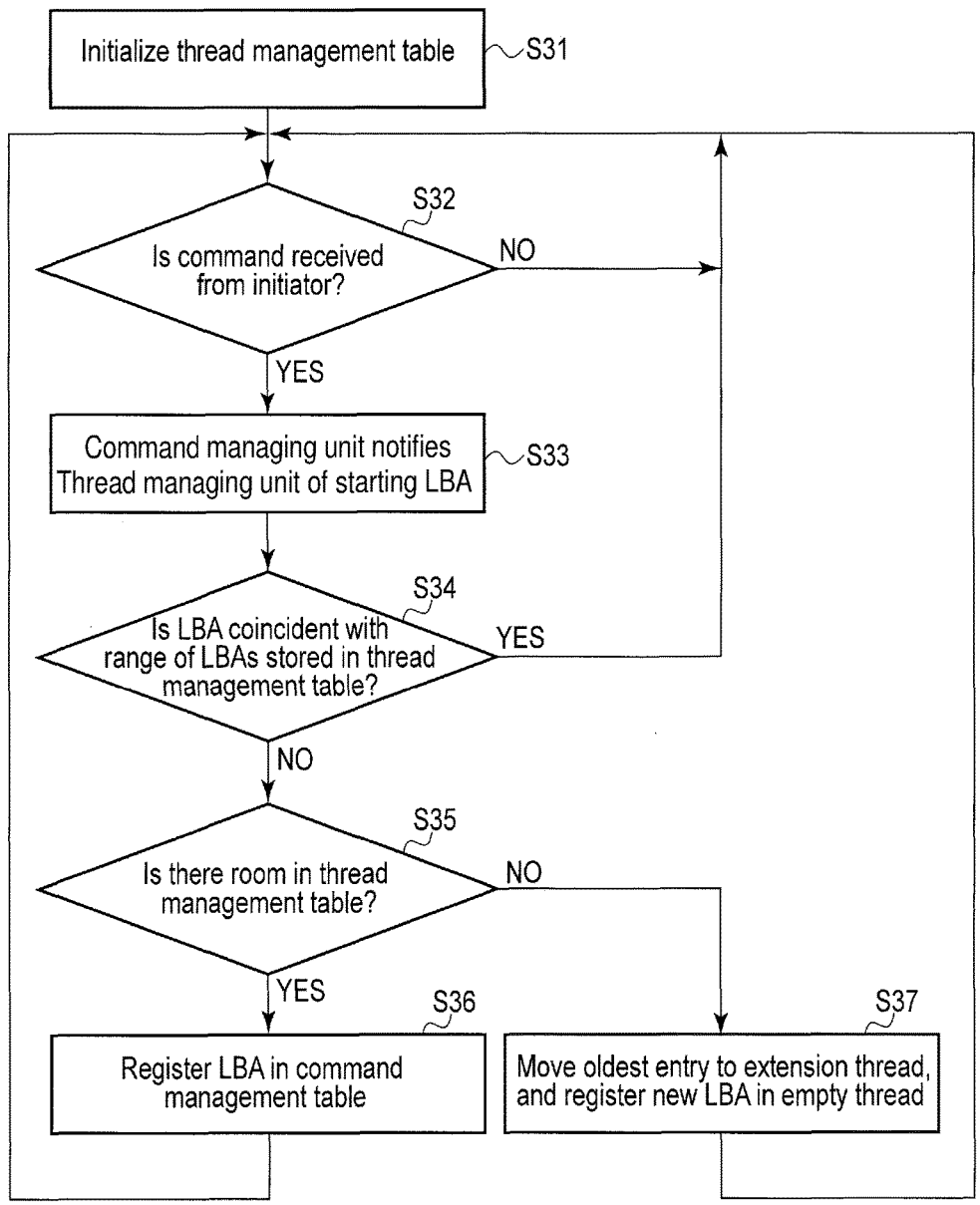
F I G. 7

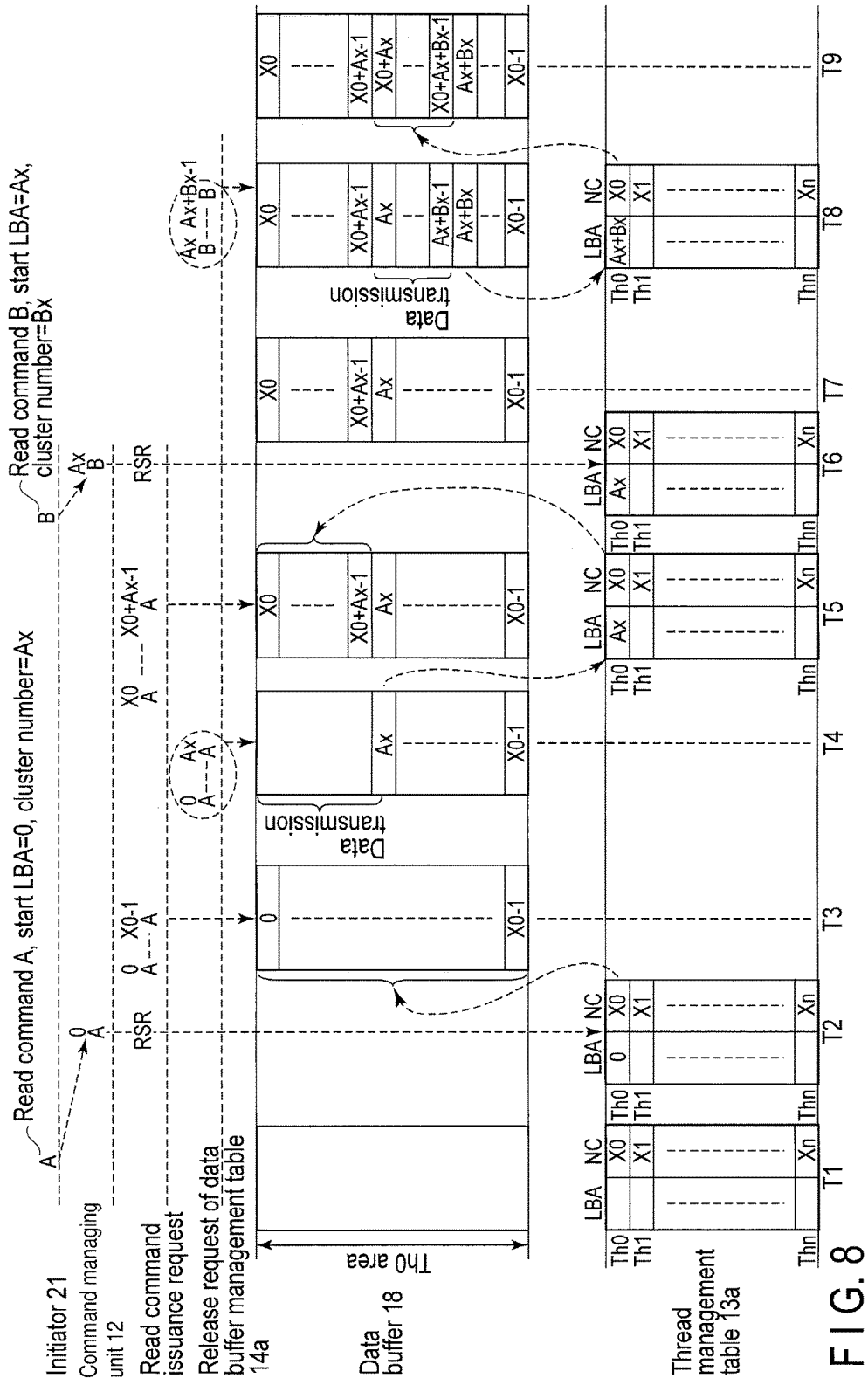
F I G. 8

MEMORY SYSTEM WITH NONVOLATILE MEMORY

CROSS-REFERENCE TO RELATED APPLICATION

This application is based upon and claims the benefit of priority from the U.S. Provisional Patent Application No. 62/156,031, filed May 1, 2015, the entire contents of which are incorporated herein by reference.

FIELD

Embodiments described herein relate generally to a memory device having a nonvolatile memory, such as a solid state drive (SSD).

BACKGROUND

In an SSD using a NAND flash memory as a nonvolatile memory, when a read command to read data is received from an initiator, such as a host, a read request corresponding to the read command is issued to the NAND flash memory, and data read from the NAND flash memory is transferred to the initiator.

BRIEF DESCRIPTION OF THE DRAWINGS

FIG. 1 is a block diagram of a memory system according to an embodiment.

FIG. 5 illustrates a relationship between the thread management table and a data buffer in the memory system.

FIG. 6 is a sequence chart showing an operation carried out by the memory system shown in FIG. 1.

FIG. 7 is a flowchart showing an example of operations carried out by the thread managing unit and the command managing unit.

FIG. 8 illustrates an example of processing of sequential read commands.

DETAILED DESCRIPTION

Figure 2:
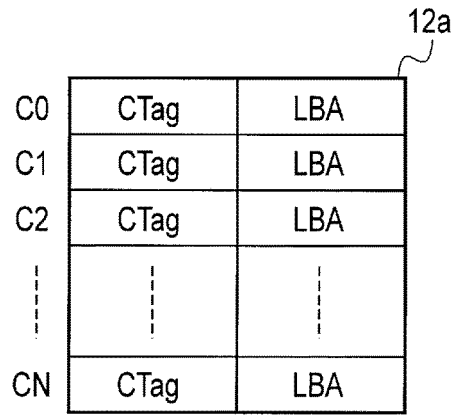
FIG. 2 illustrates an example of a command management table managed by a command managing unit of the memory system.

In general, according to an embodiment, a memory device includes a nonvolatile memory unit, a volatile memory unit, and a memory controller configured to receive a read command from a host, store data read from the nonvolatile memory unit in the volatile memory unit, and transfer data stored in the volatile memory unit to the host. When the memory controller receives a first read command designating a first address range of the nonvolatile memory, the memory controller reads data of a second address range that includes and is longer than the first address range from the nonvolatile memory unit, stores the data of the second address range in the volatile memory unit, and then transfers the data of the first address range from the volatile memory unit to the host. When the memory controller receives a second read command designating a third address range that follows the first address range and is within the second address range, after receiving the first read command, the memory controller transfers corresponding data that has been already stored in the volatile memory unit to the host.

Hereinafter, an embodiment will be described with reference to the drawings. In the drawings, identical parts are denoted by identical reference symbols.

FIG. 1 illustrates a memory system, e.g., an SSD, according to the embodiment. Specifically, FIG. 1 schematically illustrates a configuration of a read system of the SSD. The configuration of a write system, error-correction circuit, and the like are omitted.

A configuration of an SSD 11 will be described below with reference to FIG. 1. The SSD 11 includes the following hardware elements, for example, a plurality of communication ports Phy0, Phy1, and Phy2, a command managing unit 12, a thread managing unit 13, a data buffer managing unit 14, a read command issuance controller 15, a NAND flash memory controller (hereinafter referred to as the NANDC) 16, a plurality of NAND flash memories (hereinafter referred to as NANDs) 17-0 to 17-$n$, a data buffer 18, and a plurality of command execution controllers 19-0 to 19-2.

The communication ports Phy0, Phy1, and Phy2 are part of an interface of, for example, a serial attached SCSI (SAS), and communicate with an initiator 21 (e.g., host). The communication ports Phy0, Phy1 and Phy2 receive a read command RC issued from the initiator 21, and transfer data read from the data buffer 18 to the initiator 21.

The command managing unit 12 issues a read start request RSR to read data from the NANDs 17-0 to 17-$n$ on the basis of a read command RC issued from the initiator 21. Furthermore, the command managing unit 12 controls the command execution controllers 19-0 to 19-2 to transfer data stored in the data buffer 18 in sequence to the initiator 21. Besides, upon receipt of a signal DTD indicating that transfer of data from the command execution controllers 19-0 to 19-2 to the initiator 21 has been completed, the command managing unit 12 transmits a release request of a DTag to the data buffer managing unit 14.

The number of the communication ports Phy0, Phy1, and Phy2 and the number of the command execution controllers 19-0 to 19-2 are not limited to three, and can be changed.

FIG. 2 shows an example of a command management table 12$a$ provided in the command managing unit 12. The command management table 12$a$ includes a plurality of entries C0 to CN. Each entry includes a CTag serving as, for example, an identifier of a read command RC, and logical address (hereinafter referred to as LBA) attached to the read command RC. The LBA indicates a start position of data transfer.

The command managing unit 12 receives a read command RC and LBA issued from the initiator 21 through the communication ports Phy0, Phy1, and Phy2, and stores a CTag and LBA corresponding to the read command RC in an empty entry of the command management table 12$a$. When the CTag and LBA are stored, the command managing unit 12 issues a read start request RSR to the thread managing unit 13 in order to read data from the NANDs 17-0 to 17-$n$. The read start request RSR requests read of a cluster including the LBA designated by the read command RC.

The thread managing unit 13 shown in FIG. 1 manages read of data corresponding to consecutive LBAs of a given range, by each of different LBA portions in the range, in response to the read start request RSR received from the command managing unit 12. The thread managing unit 13 uses a unit named thread to manage one of the different LBA portions in the range, and there is a plurality of threads corresponding to the plurality of LBA portions in the range. In other words, the thread is a unit for managing a portion of consecutive LBAs of the range, and the thread managing unit 13 includes a plurality of threads.

Figure 3:
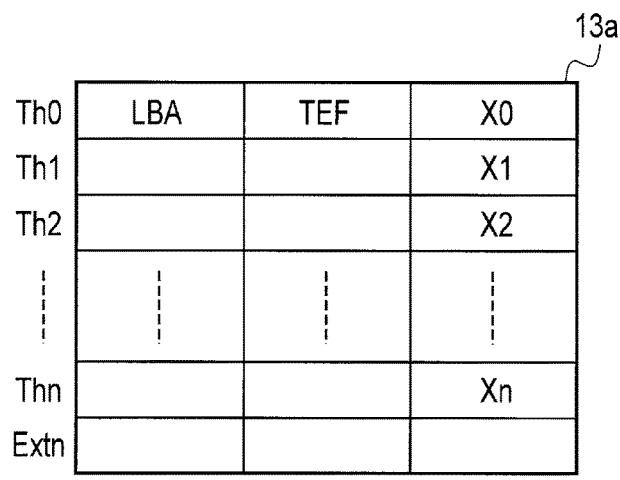
FIG. 3 illustrates an example of a thread management table managed by a thread managing unit of the memory system.

FIG. 3 shows an example of a thread management table 13*a* managed by the thread managing unit 13. The thread management table 13*a* includes a plurality of threads Th0 to Thn, and an extension thread Exth. Each thread includes, for example, an LBA, a thread entry flag TEF, and a credit number Xn. The thread entry flag TEF is a flag indicating whether or not the corresponding thread is being managed. When the corresponding thread is being managed, the thread entry flag TEF is asserted, and when the corresponding thread is not being managed, the thread entry flag TEF is deasserted.

The credit number Xn indicates the number of consecutive LBAs continuing from an LBA in the same thread.

The extension thread Exth is an area to be utilized in order to delete the oldest entry when there is no empty thread in the threads Th0 to Thn of the thread management table 13*a*. For example, it is assumed that all the threads from Th0 to Thn are utilized, and the oldest thread among these threads is Th0. In this state, when a new LBA is to be registered, contents of the oldest thread Th0 are moved to the extension thread Exth, and the new LBA is registered in the thread Th0. As described above, when a command corresponding to the oldest thread Th0 remains as it is by moving the contents of the oldest thread Th0 to the extension thread Exth, it is possible to surely execute the command corresponding to the oldest thread Th0.

It should be noted that the thread management table 13*a* is created, for example, in the initial setting of the SSD 11, and a credit number Xn is set during the initial setting.

As shown in FIG. 1, upon receipt of a read start request RSR from the command managing unit 12, the thread managing unit 13 registers an LBA included in the read start request RSR in an empty thread of the thread management table 13*a* when there is room in one of the threads, and the LBA included in the read start request RSR is not coincident with any of the LBAs managed in the thread management table 13*a*. The thread managing unit 13 sends to the read command issuance controller 15 a read command issuance request RCIR for each thread in order to read data from the NANDs 17-0 to 17-*n*. The read command issuance request RCIR is a request to read data corresponding to consecutive LBAs of a given range continuing from an LBA registered in each thread.

The LBA of the thread management table 13*a* is updated on the basis of an LBA update instruction supplied from the data buffer managing unit 14. Further, upon receipt of a notification of information about an empty area of the data buffer 18 from the data buffer managing unit 14, the thread managing unit 13 issues a read command issuance request RCIR.

The data buffer managing unit 14 manages each thread of the thread management table 13*a* and data stored in the data buffer 18 in units of cluster in association with each other. Accordingly, when a read command issuance request RCIR is supplied from the thread managing unit 13 to the read command issuance controller 15, the data buffer managing unit 14 notifies the read command issuance controller 15 of the DTag assigned to each thread of the thread management table 13*a* in units of cluster of the data buffer 18.

Here, the cluster is a minimum unit of access to the NANDs 17-0 to 17-*n*. One cluster includes, for example, eight sectors. A sector is a minimum unit (access unit) of data transfer to the initiator 21, and one sector has a size of, for example, 512 bytes. An LBA is assigned to each sector.

Figure 4:
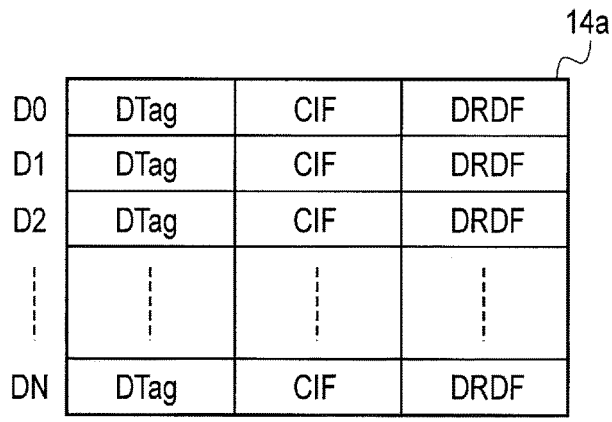
FIG. 4 illustrates an example of a data buffer management table managed by a data buffer managing unit of the memory system.

FIG. 4 shows an example of a data buffer management table 14*a* managed by the data buffer managing unit 14.

The data buffer management table 14*a* includes a plurality of entries D0 to DN. The entry DN indicates the maximum number of clusters that can be stored in the data buffer 18. Each entry includes a DTag, a command issuance flag CIF, and a data reception completion flag DRDF. As described above, the DTag indicates a cluster storage area of the data buffer 18. The DTag is assigned in advance to each thread of the thread management table 13*a* in units of cluster. The command issuance flag CIF is a flag indicating that a read command of the NANDs 17-0 to 17-*n* has been issued. The data reception completion flag DRDF is a flag indicating that data has been transferred from the NANDs 17-0 to 17-*n* to the data buffer 18.

When a NAND read command NRC is issued, the data buffer managing unit 14 asserts the command issuance flag CIF of the corresponding DTag.

The read command issuance controller 15 shown in FIG. 1 issues the NAND read command NRC for each cluster on the basis of a read command issuance request RCIR supplied from the thread managing unit 13 by adding a DTag supplied from the data buffer managing unit 14 thereto. This NAND read command NRC is supplied to the NANDC 16. It should be noted that although the read command issuance request RCIR and the NAND read command NRC are represented as different read commands for convenience of explanation, these commands may be identical.

The NANDC 16 controls operations of read, write, erase, and the like of the NANDs 17-0 to 17-*n*. The NANDC 16 reads data from the NANDs 17-0 to 17-*n* in units of cluster on the basis of an LBA included in the NAND read command NRC. The data read in units of cluster are transferred to the data buffer 18.

The data buffer 18 is, for example, a volatile memory such as a static RAM, and stores therein data supplied from the NANDC 16 in units of cluster. Upon completion of the data storage, the data buffer 18 sends the DTag supplied from the NANDC 16 to the data buffer managing unit 14 as a transfer completion notification.

The data reception completion flag DRDF of the data buffer management table 14*a* is asserted on the basis of the DTag supplied from the data buffer 18.

FIG. 5 shows a relationship between the thread management table 13*a* and data buffer 18 managed by the data buffer management table 14*a*. It is assumed that each of the credit numbers X0 to Xn, and XE of the thread management table 13*a* is "8". In this case, data corresponding to eight consecutive LBAs continuing from the leading LBA are areas (credit areas) corresponding to the credit numbers of the threads Th0 to Thn, and each credit area corresponds to one cluster. Accordingly, the credit areas of the threads Th0 to Thn respectively correspond to the clusters X0 to Xn. These clusters X0 to Xn correspond to the areas designated by the DTags of the data buffer 18. Accordingly, areas of the data buffer 18 managed in the data buffer management table 14*a* are areas corresponding to the credit numbers of the threads Th0 to Thn, i.e., the sum total Thn+1 of the sum Thn of the clusters X0 to Xn, and cluster XE corresponding to the extension thread Exth.

(Operation)

FIG. 6 shows a schematic operation of the memory system shown in FIG. 1.

When a read command RC is issued from the initiator 21, the read command RC is supplied to the command managing unit 12 through the communication ports Phy0, Phy1, and Phy2 (S11). Upon receipt of the read command RC from the initiator 21, the command managing unit 12 registers a CTag used to identify the command and transfer start LBA, in an empty entry of the command management table 12a shown in FIG. 2. When the CTag and the LBA are registered in the empty entry, the command managing unit 12 sends a read start request RSR to the thread managing unit 13 (S12).

When the LBA is not coincident with any of LBAs managed in the thread management table 13a, the thread managing unit 13 registers an LBA included in the read start request RSR in an empty thread of the thread management table 13a (S13). It is possible to determine whether or not a thread is an empty thread according to the state of the thread entry flag TEF. A thread entry flag TEF of a thread in which an LBA is registered is asserted.

When the LBA is registered in the thread, the thread managing unit 13 issues read command issuance requests RCIR corresponding to the secured credit numbers continuing from the cluster including the leading LBA to the read command issuance controller 15 in order to read data corresponding to the registered LBA from the NANDs 17-0 to 17-n (S14).

When the read command issuance request RCIR is issued from the thread managing unit 13, the data buffer managing unit 14 notifies the read command issuance controller 15 of the DTag assigned to each thread of the thread management table 13a in units of cluster of the data buffer 18 (S15).

The read command issuance controller 15 issues a NAND read command NRC to the NANDC 16 by adding the DTag supplied from the data buffer managing unit 14 thereto (S16). Furthermore, upon issuance of the NAND read command NRC, the read command issuance controller 15 sends an issuance completion notification to the data buffer managing unit 14 (S17).

The data buffer managing unit 14 asserts the command issuance flag CIF of the data buffer management table 14a on the basis of the issuance completion notification (S18). The DTag having an asserted command issuance flag CIF becomes unavailable. Accordingly, the data buffer managing unit 14 notifies the thread managing unit 13 of areas of the data buffer 18 that are currently used or empty areas thereof (S19). The thread managing unit 13 may assert the thread entry flag TEF of the thread management table 13a on the basis of this notification.

When the NAND read command NRC is supplied from the read command issuance controller 15, the NANDC 16 reads data from the NANDs 17-0 to 17-n in units of cluster using an LBA included in the read command NRC as the beginning address (S20). The data read in units of cluster are transferred to the data buffer 18 (S21).

Upon completion of storage of data corresponding to one cluster, the data buffer 18 sends a DTag to the data buffer managing unit 14 as a transfer completion notification (S22).

Upon receipt of the DTag as the transfer completion notification from the data buffer 18, the data buffer managing unit 14 asserts a data reception completion flag DRDF of the data buffer management table 14a corresponding to the DTag(S23). In the data buffer management table 14a, data corresponding to the DTag having an asserted command issuance flag CIF and an asserted data reception completion flag DRDF is ready to be transferred to the initiator 21. Accordingly, the data buffer managing unit 14 notifies the command managing unit 12 of the DTag corresponding to the transferable data (S24).

The command managing unit 12 starts one of the command execution controllers 19-0 to 19-2 on the basis of the received DTag (S25). That is, the command managing unit 12 instructs one of the command execution controllers 19-0 to 19-2 to transfer data corresponding to the oldest command of the transferable data.

One of the command execution controllers 19-0 to 19-2 reads data from the data buffer 18 on the basis of an LBA registered in the command management table 12a, and transfers the data to the initiator 21 through corresponding one of the communication ports Phy0, Phy1, and Phy2 (S26).

Upon completion of the data transfer, one of the command execution controllers 19-0 to 19-2 notifies the command managing unit 12 of a signal DTD indicating that the data transfer has been completed (S27).

Upon receipt of the signal DTD, the command managing unit 12 sends a release request of the LBA and DTag for which the data transfer has been completed to the data buffer managing unit 14 (S28).

The data buffer managing unit 14 deasserts the command issuance flag CIF and data reception completion flag DRDF corresponding to the DTag of the data buffer management table 14a on the basis of the release request, and deletes the entry of the DTag (S29). Subsequently, the data buffer managing unit 14 notifies the thread managing unit 13 of the released LBA (S30).

The thread managing unit 13 updates the LBA of the thread management table 13a on the basis of the notified LBA (S31).

In the present embodiment, SAS is used for communication, and hence it is required that data in a command be transmitted sequentially. As transfer of data regarding an LBA transmitted last and LBAs earlier than that is already completed, these LBAs can be excepted from management targets. For example, in the case where the LBA is "0", and the credit number is "8", when LBA transmission is completed up to "3", the LBA of the thread management table 13a is updated to "4".

As described above, when the LBA is updated, the control process proceeds to step S14, a read command issuance request RCIR to read data that is in the range of the credit number "8" from the LBA "4" from the NANDs 17-0 to 17-n is issued and, thereafter data determined by a credit number indicating LBAs having the LBA registered in the thread management table 13a as the leading LBA is read from the NANDs 17-0 to 17-n according to the operation described above, and is stored in the data buffer 18. This operation is executed each time the LBA is updated. Accordingly, data in the range of the credit number from the updated LBA is prefetched from the NANDs 17-0 to 17-n, and is prestored in the data buffer 18.

(Operation of Thread Management Section 13)

FIG. 7 shows an example of the operations carried out by the thread managing unit 13 and command managing unit 12.

For example, at the start time of the memory system 11, the thread management table 13a is initialized, and the management thread number n of the thread management table 13a, the extension thread Exth, and the credit number of each of the threads Th0 to Thn are set (S31).

Subsequently, when a read command RC is received from the initiator 21 (YES in S32), the received read command RC is registered in the command management table 12a, and an LBA that is attached to the read command RC and indicates a transfer start position is notified to the thread management unit 13 (S33).

The thread managing unit 13 confirms whether or not the LBA notified by the command managing unit matches each of the LBAs of the threads managed in the thread management table 13a (S34). More specifically, the managed LBAs are consecutive LBAs of a number indicated by a thread number starting from the leading LBA registered in each thread. That is, when the thread number is "8", eight consecutive LBAs starting from the leading LBA are the managed LBAs, and it is determined whether or not one of the managed LBAs and the LBA notified by the command managing unit 12 are coincident with each other. When the notified LBA and one of the managed LBAs are coincident with each other as a result of the determination, registration of the LBA in the thread management table 13a is not carried out (S34).

On the other hand, when the notified LBA and one of the managed LBAs are not coincident with each other as a result of the determination, it is determined whether or not there is room in the threads managed in the thread management table 13a (S35). When an empty thread is present (Yes in S35), the LBA notified by the command managing unit 12 is registered in the thread management table 13a, and thread management is started (S36).

When there is no empty thread (No in S35), a DTag, a command issuance flag CIF, and a data reception completion flag DRDF of the thread registered earliest are moved to the extension thread Exth shown in FIG. 3. At the same time, the DTag managed in the extension thread Exth is moved to the thread registered earliest. Subsequently, the LBA notified by the command managing unit 12 is registered in the empty thread (S37).

Regarding the thread registered in the extension thread Exth, read command issuance is stopped, it is confirmed that all of data reception completion flags DRDF for the already issued read commands are asserted, and the command issuance flags CIF and data reception completion flags DRDF of all of the DTags moved to the extension thread Exth are deasserted.

By using the extension thread Exth, transmission of data corresponding to the oldest command is enabled, and the data corresponding to the oldest command can be deleted from one of the threads Th0-Thn.

(Processing of Sequential Read Command)

FIG. 8 shows an example of the operation to be carried out when a plurality of read commands to read data of consecutive LBAs is issued.

At time T1, the SSD 11 is started, and n threads Th0 to Thn to be managed in the thread management table 13a and credit numbers (NC) X0 to Xn of the threads Th0 to Thn are initialized. In FIG. 8, the extension thread Exth and the thread entry flag TEF are omitted. At this time, the area managed as the thread Th0 of the data buffer 18 is in the empty state. It is assumed, in this state, that a read command A (start LBA=0, cluster number=Ax) is issued from the initiator 21.

At time T2, the read command A is registered in the command management table 12a, and a read start request RSR is issued to the thread managing unit 13. Upon receipt of the read start request RSR, the thread managing unit 13 registers the LBA (=0) in the empty thread Th0 of the thread management table 13a. Furthermore, the thread managing unit 13 issues a read command issuance request RCIR (not shown) in order to read data corresponding to the credit number X0 starting from the LBA (=0) as the leading address. That is, X0 read command issuance requests RCIR are issued.

At time T3, as described above, data is read from the NANDs 17-0 to 17-n in units of cluster through the read command issuance controller 15 and NANDC 16 on the basis of the read command issuance request RCIR, and is transferred to the data buffer 18. Accordingly, data of the number corresponding to the credit number X0 (0 to X0−1) starting from the LBA (=0) of the read command A are stored in the data buffer 18. When the data are transferred from the NANDs 17-0 to 17-n to the data buffer 18, a data reception completion flag DRDF (not shown) in the data management table 14a is asserted.

At time T4, the command managing unit 12 starts one of the command execution controllers 19-0 to 19-3 in order to transfer data of the cluster for which the data reception completion flag DRDF of the data management table 14a has been asserted to the initiator 21. Accordingly, data (LBA=0 to LBA=Ax−1) corresponding to the cluster number (=Ax) continuing from the LBA (=0) designated by the read command A is transferred from the data buffer 18 to the initiator 21.

When a series of data transfer operations has been completed, the command managing unit 12 releases a DTag of the data buffer management table 14, and the thread managing unit 13 updates an LBA of the corresponding thread in the thread management table 13a.

That is, at time T5, the LBA of the thread Th0 is updated to the LBA (=Ax) subsequent to the last transmitted LBA (=Ax−1). The thread managing unit 13 issues a read command issuance request RCIR on the basis of the updated LBA (=Ax), and credit number (=X0). Data of X0 to X0+Ax−1 read from the NANDs 17-0 to 17-n according to the read command issuance request RCIR is stored in the data buffer 18.

In this manner, when transfer of all data associated with the read command A is finished, and a read command issuance request RCIR for the empty DTag is issued, the range of the LBAs managed in the thread management table 13a becomes a range having the start cluster (=X0) and end cluster (=X0+Ax−1).

It is assumed, in this state, that at time T6, a read command B (start LBA=Ax, cluster number=Bx) is received from the initiator 21. The LBA of this read command B continues to the LBA of the read command A. In this case, the start LAB (=Ax) of the read command B is coincident with the LBA (=Ax) managed in the thread Th0 of the thread management table 13a. Accordingly, data corresponding to the LBA (=Ax to Bx−1) designated by the read command B is already stored in the data buffer 18.

Accordingly, at time T7, the thread managing unit 13 does not register the LBA of the read command B. Then, at time T8, the command managing unit 12 (not shown) immediately starts one of the command execution controllers 19-0 to 19-3, and transfers data of the LBA (=Ax to Ax+Bx−1) from the data buffer 18 to the initiator 21.

When a series of data transfer operations has been completed, the command managing unit 12 requests release of the DTag of the data buffer management table 14a, and the thread managing unit 13 updates an LBA of the corresponding thread of the thread management table 13a.

That is, as shown at time T8, the LBA (=Ax) of the thread Th0 is updated to the LBA (=Ax+Bx) subsequent to the last transmitted LBA (=Ax+Bx−1). The thread managing unit 13 issues a read command issuance request RCIR again on the basis of the updated LBA (=Ax+Bx) of the thread management table 13a and credit number (=X0).

Data of X0+Ax to X0+Ax+Bx−1 read from the NANDs 17-0 to 17-n according to the read command issuance request RCIR is stored in the data buffer 18 at time T9.

The above-described operation is repeated each time a read command is issued from the initiator 21.

(Advantage of Embodiment)

According to the present embodiment, when an LBA managed in the thread management table 13a is updated, the thread managing unit 13 issues a read command issuance request RCIR in order to read data of LBAs consecutively continuing from the updated LBA by a number determined by a credit number from the NANDs 17-0 to 17-n. Accordingly, data of an LBA subsequent to the last LBA transmitted to the initiator 21 is stored in the data buffer 18. Therefore, when a new read command is issued from the initiator 21, and an LBA of this read command is within a range of the LBAs managed in the thread management table 13a, it is possible to transfer data stored in the data buffer 18 to the initiator 21 without reading data from the NANDs 17-0 to 17-n. Accordingly, it is possible to promptly respond to the read command.

In general, when a plurality of read commands to read data of consecutive LBAs is consecutively issued from the initiator, these commands are separately processed as commands irrelevant to each other. Accordingly, upon receipt of each command, the SSD reads data requested by each command from the NAND flash memory, and transfers the data to the initiator. Accordingly, the time to read the data from the NAND flash memory would include the period of time from command reception to data transfer, and it would not be possible to efficiently carry out the data transfer.

In the present embodiment, relationships between LBAs included in a plurality of commands are analyzed, and, for commands relevant to each other, data stored in the data buffer 18 is transferred to the initiator 21 without reading data from the NANDs 17-0 to 17-n. Accordingly, when a plurality of read commands to read data of consecutive LBAs is consecutively issued, it is possible to efficiently carry out the data transfer.

Further, the thread management table 13a includes a plurality of threads Th0 to Thn, and can manage new LBAs of different read commands issued from the initiator 21 by means of these threads Th0 to Thn. Accordingly, it is possible to deal with sequential read of a plurality of read commands issued from the initiator 21.

Besides, the thread management table 13a includes an extension thread Exth and, when commands of a number exceeding the number of threads which can be managed by using the threads Th0 to Thn are received, the thread corresponding to the oldest read command is moved to the extension thread Exth, whereby an empty thread is created. Accordingly, it is possible to register an LBA of a new read command in the empty thread.

Furthermore, by providing the extension thread Exth, it is possible to continue processing of transfer of remaining data corresponding to the oldest command to the initiator 21, and delete the oldest command.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
a nonvolatile memory;
a volatile memory;
a memory controller configured to store data read from the nonvolatile memory in accordance with a read command received from a host in the volatile memory, and transfer data stored in the volatile memory to the host;
a command managing unit configured to store a command identifier and an address for each command received by the command managing unit in a first table; and
a thread managing unit configured to assign an available thread from a group of threads to execute each command received by the command managing unit and to store thread execution information for each thread in a second table, the thread execution information including a starting LBA of the command to be executed, a number of consecutive LBAs indicated in the command, and a flag indicating whether or not the thread is active, wherein
when the memory controller receives a first read command designating a first address range of the nonvolatile memory, the memory controller reads data of a second address range that includes and is longer than the first address range from the nonvolatile memory, stores the data of the second address range in the volatile memory, and then transfers the data of the first address range from the volatile memory to the host, and
when the memory controller receives a second read command designating a third address range that follows the first address range and is within the second address range, after receiving the first read command, the memory controller transfers corresponding data that has been already stored in the volatile memory to the host.

2. The memory device according to claim 1, wherein the memory controller is further configured to read data of a fourth address range following the second address range from the nonvolatile memory and store the data of the fourth address range in the volatile memory, after the data of the first address range has been transferred from the volatile memory to the host.

3. The memory device according to claim 2, wherein the data of the first address range has a same size as a size of the data of the fourth address range.

4. The memory device according to claim 2, wherein the memory controller is further configured to read data of a fifth address range following the fourth address range from the nonvolatile memory and store the data of the fifth address range in the volatile memory, after the data of the second address range has been transferred from the volatile memory to the host.

5. The memory device according to claim 1, further comprising:
a data buffer managing unit configured to manage buffer areas configured in the volatile memory and assign one or more of the buffer areas to each thread in the group of threads,
wherein the assigned buffer areas for a thread get filled with data as the thread executes a command associated therewith.

6. The memory device according to claim 5, wherein the data buffer managing unit maintains first and second flags for each of the buffer areas, the first flag indicating whether the buffer area is assigned to a thread that is currently executing and the second flag indicating whether or not execution of the thread has completed.

7. The memory device according to claim 6, wherein the command managing unit causes transfer of data stored in the buffer areas to the host upon receiving notification that the second flag has been set for the buffer areas, and the first and second flags for the buffer areas are reset upon completion of the transfer.

8. The memory device according to claim 1, wherein if all entries of the second table are associated with active threads, the thread managing unit moves a thread that is oldest to an extension entry of the second table and moves a new thread into the entry made available by the movement of the oldest thread.

9. A method for reading data from a nonvolatile memory, comprising:
receiving, form a host, a first read command designating a first address range of the nonvolatile memory;
storing a command identifier and an address for the first read command in a first table;
assigning an available thread from a group of threads to execute the first read command;
storing thread execution information for the assigned thread in a second table, the thread execution information including a starting LBA of the first read command, a number of consecutive LBAs indicated in the first read command, and a flag indicating that the assigned thread is active;
reading data of a second address range that includes and is longer than the first address range from the nonvolatile memory;
storing the data of the second address range in a volatile memory;
transferring the data of the first address range from the volatile memory to the host;
receiving, from the host, a second read command designating a third address range that follows the first address range and is within the second address range, after receiving the first read command; and
transferring data corresponding to the third address range that has been already stored in the volatile memory to the host.

10. The method according to claim 9, further comprising:
reading data of a fourth address range following the second address range from the nonvolatile memory; and
storing data of the fourth address range in the volatile memory, after the data of the first address range has been transferred from the volatile memory to the host.

11. The method according to claim 10, wherein the data of the first address range has a same size as a size of the data of the third address range.

12. The method according to claim 10, further comprising:
reading data of a fifth address range following the fourth address range from the nonvolatile memory; and
storing the data of the fifth address range in the volatile memory, after the data of the second address range has been transferred from the volatile memory to the host.

13. The method according to claim 9, further comprising:
if all entries of the second table are associated with active threads, moving a thread that is oldest to an extension entry of the second table and moving a new thread into the entry made available by the movement of the oldest thread.

14. A memory device, comprising:
a nonvolatile memory;
a volatile memory;
a memory controller configured to store data read from the nonvolatile memory in accordance with a read command received from a host in the volatile memory, and transfer data stored in the volatile memory to the host;
a command managing unit configured to store a command identifier and an address for each command received by the command managing unit;
a thread managing unit configured to assign an available thread from a group of threads to execute each command received by the command managing unit; and
a data buffer managing unit configured to manage buffer areas configured in the volatile memory, to assign one or more of the buffer areas to each thread in the group of threads, the assigned buffer areas for a thread getting filled with data as the thread executes a command associated therewith, and to maintain first and second flags for each of the buffer areas, the first flag indicating whether the buffer area is assigned to a thread that is currently executing and the second flag indicating whether or not execution of the thread has completed, wherein
when the memory controller receives a first read command designating a first address range of the nonvolatile memory, the memory controller reads data of a second address range that includes and is longer than the first address range from the nonvolatile memory, stores the data of the second address range in the volatile memory, and then transfers the data of the first address range from the volatile memory to the host, and
when the memory controller receives a second read command designating a third address range that follows the first address range and is within the second address range, after receiving the first read command, the memory controller transfers corresponding data that has been already stored in the volatile memory to the host.

15. The memory device according to claim 14, wherein the memory controller is further configured to read data of a fourth address range following the second address range from the nonvolatile memory and store the data of the fourth address range in the volatile memory, after the data of the first address range has been transferred from the volatile memory to the host.

16. The memory device according to claim 15, wherein the data of the first address range has a same size as a size of the data of the fourth address range.

17. The memory device according to claim 15, wherein the memory controller is further configured to read data of a fifth address range following the fourth address range from the nonvolatile memory and store the data of the fifth address range in the volatile memory, after the data of the second address range has been transferred from the volatile memory to the host.

18. The memory device according to claim 14, wherein the command managing unit causes transfer of data stored in the buffer areas to the host upon receiving notification that the second flag has been set for the buffer areas, and the first and second flags for the buffer areas are reset upon completion of the transfer.

19. The memory device according to claim 14, wherein the command managing unit stores the command identifier and the address for each command received by the command managing unit in a first table, and the thread managing unit stores thread execution information for each thread in a second table, the thread execution information including a starting LBA of the command to be executed, a number of consecutive LBAs indicated in the command, and a flag indicating whether or not the thread is active.

20. The memory device according to claim 19, wherein if all entries of the second table are associated with active threads, the thread managing unit moves a thread that is oldest to an extension entry of the second table and moves a new thread into the entry made available by the movement of the oldest thread.

* * * * *